United States Patent [19]

Stamberger

[11] E Re. 29,118

[45] Reissued Jan. 18, 1977

[54] METHOD OF PREPARING POLYURETHANES FROM LIQUID, STABLE, REACTIVE, FILM-FORMING POLYMER/POLYOL MIXTURES FORMED BY POLYMERIZING AN ETHYLENICALLY UNSATURATED MONOMER IN A POLYOL

[76] Inventor: Paul Stamberger, 552 W. University Parkway, Baltimore, Md. 21210

[22] Filed: Feb. 19, 1974

[21] Appl. No.: 443,774

Related U.S. Patent Documents

Reissue of:

[64] Patent No.: 3,304,273
Issued: Feb. 14, 1967
Appl. No.: 256,531
Filed: Feb. 6, 1963

U.S. Applications:

[63] Continuation-in-part of Ser. No. 155,467, Nov. 28, 1961, abandoned.

[52] U.S. Cl. ..... 260/2.5 BE; 260/33.2 R; 260/33.4 R; 260/33.4 UR; 260/77.5 AM; 260/77.5 AP; 260/77.5 CL; 260/858; 260/859 R; 260/859 PV

[51] Int. Cl.[2] ..... C08G 18/63

[58] Field of Search ..... 260/2.5 A, 77.5 A, 77.5 C, 260/77.5 AP, 859 R, 859 PV, 33.2 R, 33.4 R, 33.4 UR, 2.5 BE, 77.5 AM, 858

[56] References Cited

UNITED STATES PATENTS

| | | | |
|---|---|---|---|
| 2,566,206 | 8/1951 | Hyman | 260/861 |
| 2,636,015 | 4/1953 | Schmutzler | 260/33.2 |
| 2,740,743 | 4/1956 | Pace | 260/2.5 |
| 2,779,689 | 1/1957 | Reis | 427/273 |
| 2,798,053 | 7/1957 | Brown | 260/2.2 |
| 2,840,447 | 6/1958 | Green | 264/182 |
| 2,861,910 | 11/1958 | Johnston | 260/858 |
| 2,879,178 | 3/1959 | McWherter | 260/77.5 AP |
| 2,884,336 | 4/1959 | Loshaek | 260/86.1 |
| 2,884,340 | 4/1959 | Losnack | 428/47 |
| 2,898,312 | 8/1959 | Szukiewicz | 260/2.5 |
| 2,922,775 | 1/1960 | Mino | 260/875 |
| 2,965,615 | 12/1960 | Tess | 260/97.5 AP |
| 3,003,841 | 5/1962 | Germain | 260/89.1 |
| 3,007,894 | 11/1961 | Bunge | 260/858 |
| 3,025,268 | 3/1962 | Deex | 260/2.5 AM |
| 3,028,367 | 4/1962 | O'Brien | 260/77.5 |
| 3,054,756 | 9/1962 | Holtschmidt | 260/75 NT |
| 3,085,983 | 4/1963 | Hardy | 260/2.5 |
| 3,085,986 | 4/1963 | Muskat | 260/23 S |
| 3,110,695 | 11/1963 | Ceresa | 260/77.5 |
| 3,165,559 | 1/1965 | Kahrs | 260/875 |
| 3,247,143 | 4/1966 | Masters | 260/23 |
| 3,247,144 | 4/1966 | Masters | 260/23 |
| 3,247,145 | 4/1966 | Masters | 260/23 |
| 3,247,154 | 4/1966 | Masters | 260/30.4 |
| 3,247,285 | 4/1966 | Belanger | 260/836 |
| 3,247,286 | 4/1966 | Masters | 260/837 |
| 3,247,287 | 4/1966 | Masters | 260/837 |
| 3,247,288 | 4/1966 | Masters | 260/837 |
| 3,247,291 | 4/1961 | Kahrs | 260/899 |
| 3,257,340 | 6/1966 | Osmond | 260/4 |
| 3,264,235 | 8/1966 | Osmond | 260/4 |
| 3,282,896 | 11/1966 | Einberg | 260/47 |
| 3,317,635 | 5/1967 | Osmond | 260/881 |
| 3,383,351 | 5/1968 | Stamberger | 260/33.4 UR |
| 3,523,093 | 8/1970 | Stamberger | 260/33.4 UR |
| 3,821,377 | 10/1966 | Lederer | 260/2.5 |
| 3,924,711 | 12/1966 | Von Bonin | 260/2.5 |

FOREIGN PATENTS OR APPLICATIONS

| | | |
|---|---|---|
| 1,152,536 | 8/1963 | Germany |
| 1,152,537 | 8/1963 | Germany |
| 1,077,430 | 9/1960 | Germany |
| 1,105,179 | 11/1961 | Germany |
| 1,111,394 | 2/1962 | Germany |
| 1,143,325 | 2/1963 | Germany |
| 159,243 | 6/1957 | Sweden |
| 715,194 | 9/1954 | United Kingdom |
| 738,883 | 10/1955 | United Kingdom |
| 924,769 | 5/1963 | United Kingdom |
| 434,783 | 6/1934 | United Kingdom |
| 846,502 | 8/1960 | United Kingdom |
| 796,294 | 6/1958 | United Kingdom |

*Primary Examiner*—C. Warren Ivy

[57] ABSTRACT

*This invention provides a method for preparing elastic polyurethanes from organic polyisocyanates and polymer-polyol mixtures, wherein the polymer is obtained by polymerizing an ethylenically unsaturated monomer in a polyol. This invention further provides a method for preparing cellular polyurethanes from organic polyisocyanates and polymer-polyol mixtures, wherein the polymer is obtained by polymerizing an ethylenically unsaturated monomer in a polyol. This invention still further provides polyurethanes produced by the aforementioned methods.*

42 Claims, No Drawings

METHOD OF PREPARING POLYURETHANES FROM LIQUID, STABLE, REACTIVE, FILM-FORMING POLYMER/POLYOL MIXTURES FORMED BY POLYMERIZING AN ETHYLENICALLY UNSATURATED MONOMER IN A POLYOL

Matter enclosed in heavy brackets [ ] appears in the original patent but forms no part of this reissue specification; matter printed in italics indicates the additions made by reissue.

This application is a continuation-in-part of copending application Ser. No. 155,467, filed Nov. 28, 1961, and now abandoned.

This invention relates to novel methods of preparing polyurethanes, to reactive solutions therefor and to products produced by such methods.

Polyurethanes constitute a broad class of polymeric materials having a wide range of physical characteristics. The polymers are produced through the interaction of a polyfunctional isocyanate with a polyfunctional chemical compound having an active hydrogen in its structure such as a polyester, polyesteramide or polyether or mixtures of two or more of such materials. This component used in preparing the polyurethane is generally termed by the art the "active-hydrogen-containing material" and is generally liquid or a solid capable of being melted at a relatively low temperature. The materials conventionally used contain hydroxyl groups as the radical having the active hydrogen and thus are generally termed "polyols." The preparation of such materials is shown, for example, in U.S. 2,888,409 and in the patents referred to therein. In addition, other hydroxylcapped polymers useful as the polyol in preparing polyurethane resins include polyformals as described, for example, in U.S. 3,055,871 to Heffler et al.; the hydroxyl-terminated lactone polyesters described in U.S. 3,051,687 to Young et al.; the alkylene oxide adducts of the allyl alcohol-styrene polymers as described in U.S. 2,965,615 to Tass, etc. For reasons of commercial availability and cost, it is conventional to use polyethers having hydroxyl-terminated chains in the preparation of polyurethane foams and either such polyethers or hydroxyl-terminated polyesters in preparing vulcanizable gum, adhesives, films, etc. The polyurethane end products are generally cross-linked to some extent by including with the polyol (which is generally directional) a small amount of polyfunctional cross-linking agent.

Despite the variety of physical and chemical properties obtainable by proper selection of the polyisocyanate and the polyol, as well as the conditions under which the reaction is carried out, there are definite limitations in selecting components for desirable properties in the resulting resin. One of the most significant of such limitations arises from the fact that the polyol is generally of relatively low molecular weight arising from the fact that it must be sufficiently liquid to permit mixing and reaction with the polyfunctional polyisocyanate in producing the final polyurethane resin. Further, the use of higher molecular weight components is attended by a variety of other difficulties including handling and compounding problems, the use of inert solvents and the problems attendant thereon as solvent removal, shrinkage, etc.

A great deal of art has grown up reflecting the extensive efforts made to incorporate higher molecular weight resinous material in polyurethane formulations. Such efforts range from mere mechanical mixtures as described, for example, in U.S. 3,049,505 to Grabowski, to such other means as the addition of a polymer latex as described in U.S. 2,993,013 to Wolfe, wherein an aqueous elastomer latex is added as one component to an isocyanate-terminated polyurethane so that the water phase of the latex reacts with the free isocyanate groups and at the same time the elastomer of the latex is incorporated into the resulting polyurethane.

Another means shown by the art is in U.S. 2,698,838 to Simon et al., wherein a small amount of the desired polymer is dissolved in a large excess of the polyfunctional isocyanate. Where the polymer is inert to the isocyanate, it is merely mechanically incorporated into the resulting polyurethane, while, where a reaction occurs, the reactive radicals in the polymer itself may enter into a reaction with the polyisocyanate.

Still another means shown by the art is in U.S. 3,008,917 to Park et al., wherein an unsaturated liquid monomer such as styrene is added to a polyester-isocyanate adduct which itself contains vinyl unsaturation (as by utilizing a polyester prepared from maleic anhydride or similar unsaturated acid). The resulting mixture is then copolymerized through the unsaturated linkages.

Yet another method is shown in U.S. 2,882,260 to Bartl et al. In this process an isocyanate is attached to an ethylenically unsaturated compound, the isocyanate group is then blocked to render it non-reactive and the resulting compound is copolymerized as with styrene or a similar monomer in aqueous emulsion or similar process and the resulting polymeric product is dried and then heated to unblock the isocyanate groups and cause cross-linkage.

Despite the variety and ingenuity displayed by such art, polyurethanes still remain greatly limited in practical methods for the inclusion of higher molecular weight polymers therein.

Accordingly, it is a primary purpose of the present invention to present novel methods of forming polyurethanes which employ high molecular weight film-forming polymers in the polyurethane reaction.

It is a further object of the invention to provide a means of incorporating body agents in polyurethanes without the necessity of additional non-reactive solvents as carriers for such bodying agents.

Another object of the invention is to incorporate high molecular weight film-forming polymers as one of the reactants in forming polyurethanes whereby the film-forming polymers are chemically incorporated in the resulting polyurethane.

A further object of the invention is to incorporate high molecular weight film-forming polymers in polyurethane resins without complicated or cumbersome processing techniques.

It is another principal object of the present invention to provide a novel method of forming polyurethanes utilizing high molecular weight film-forming polymers as one of the components in the polyurethane reaction.

It is still another primary object of the present invention to provide a novel process of forming polyurethanes in which a high molecular weight, film-forming polymer is one of the reactants, said polymer being used as a solution or dispersion in the polyol which is used to react with the polyfunctional isocyanates in forming polyurethanes.

It is still a further object of the present invention to produce film-forming polymers having radicals reactive with the isocyanato radical in a solvent medium also having radicals reactive with said isocyanato radical.

Another object of the present invention is to provide a process for the production of polyurethanes which is carried out with liquid reactants, including a polyfunctional isocyanate, a high molecular weight film-forming polymer in a solvent for said polymer reactive with the isocyanato radical, which involves a minimum of handling and compounding problems, and which results in negligible shrinkage of the polyurethane reaction product.

Another object of the present invention is to provide novel and improved polyurethanes resulting from the novel processes of the instant application.

These and other objects and advantages of the present invention will become more apparent upon reference to the following detailed description and appended claims.

In essence, the invention of the instant application has two essential aspects. The first of these involves the formulation of a novel reactive solution. The second of these involves the reaction of said novel solution with polyfunctional isocyanates to form novel polyurethanes.

The novel reactive solution of the present invention comprises two essential components. A relatively high molecular weight film-forming polymer having radicals which are reactive with the —N=C=O radicals of the isocyanate used to form the polyurethane and a reactive solvent which is a solvent or dispersing medium for said polymer, and which also contains radicals which are reactive with the isocyanato group. Upon addition of the polyisocyanate to the reactive solutions of the invention, there results a polyurethane in which the film-forming polymer and the reactive solvent both enter into a chemical reaction and are bound as an integral part in the resulting polyurethanes.

Any type of film-forming polymer containing radicals which are reactive with the isocyanato radical may be used. Such polymers may be formed from ethylenically unsaturated monomers, from acetylenically unsaturated monomers, or by condensation reactions. Condensation polymers which may be used include, for example, phenol-formaldehyde resins, urea-formaldehyde resins, melamine-formaldehyde resins, polyacetones, etc. In addition, polymers may be prepared from naturally occurring polymeric materials as, for example, from cellulose, starch, dextran, alginic acid, etc., as by etherification or esterification. Examples of such polymers include cellulose acetate-butyrate and the ethyl ether of cellulose, starch, or dextran. It is only necessary that the film-forming polymer contain radicals reactive with the isocyanato group and be either soluble or dispersible in the reactive solvent used in preparing the solution.

The preferred reactive radical (i.e. reactive with the isocyanato group) is an active hydrogen [The term "active hydrogen" refers to hydrogen atoms, which, because of their position in the molecule, display activity according to the Zerewitinoff test as described by Wohler in the Journal of the American Chemical Society, vol. 49, page 3181(1927)]. Examples of reactive radicals which may be used successfully are —COOH, —OH, —$NH_2$, =NH, =N, —$CONH_2$, substituted ammonias such as quaternary ammonium, mercapto compounds, etc.

The film-forming polymers used in the instant invention may be prepared by conventional techniques. Thus, for example, polymers may be prepared from the ethylenically unsaturated monomers and/or the acetylenically unsaturated monomers by such conventional techniques as suspension, solution, emulsion and bulk polymerization. Block and graft polymerization processes may also be used. The manner of polymerization can strongly affect the solubility of the polymer and also the physical properties of the polyurethane prepared from the reactive solutions. Thus, some ethylenically unsaturated monomers yield soluble polymers only when polymerized in the reactive solvent itself, some (which give soluble polymers when polymerized in bulk or in solvents such as toluene, etc.) give insoluble polymers when polymerized in the reactive solvent, and other monomers give soluble polymers when polymerized under a variety of conditions.

In the instant invention the film-forming polymers which are particularly preferred are those obtained by polymerizing one or more ethylenically unsaturated monomers in solution in the reactive solvent itself. As compared to utilizing film-forming polymers prepared from precisely the same monomers by other processes, these preferred solutions of the invention yield polyurethanes having superior physical properties as well as offering advantages in greater ease of preparation and handling.

With respect to preparing film-forming polymers from ethylenically unsaturated monomers, reactive radicals may be introduced into the polymer in several ways. Where none of the monomers themselves contain a reactive group, the reactive radical may be introduced into the film-forming polymer by appropriate treatment of the resulting polymer, as for example, by hydrolyzing the polymer (as hydrolyzing polyvinyl acetate to introduce hydroxyls), by grafting (as in grafting acrylic acid, etc., on a polymerized diene, as described in U.S. 2,859,201), by oxidation (as shown for example in U.S. 2,762,790), etc. See also U.S. 2,837,496. It is preferred to incorporate the reactive group by using a monomer which itself contains such reactive group. Thus, in the case of a homopolymer, the ethylenically unsaturated monomer used to form the homopolymer may have at least one such reactive radical attached to the ethylenically unsaturated group (i.e., diene, vinyl group, etc.), which is responsible for the formation of the polymer chain. Similarly, where a copolymer or terpolymer is prepared, one or more of the monomers may itself contain at least one such reactive group, the other monomer or monomers not having reactive radicals. It is not necessary for all of the monomers to contain reactive radicals. Illustrative of monomers which have reactive radicals are acrylic acid, methacrylic acid, crotonic acid, itaconic acid, 2-hydroxyethyl methacrylate, t-butylaminoethyl methacrylate, dimethylaminoethyl methacrylate, glycidyl acrylate, glycol monoesters of itaconic acid, methyl monoester of itaconic acid, acrylamide or substituted acrylamides, allyl alcohol, maleic acid, fumaric acid, etc. Examples of monomers not having reactive radicals are styrenes, butadienes, acrylic esters, vinyl esters, etc. Such compounds include, for example, styrene, vinyl toluene, 2,5-dichlorostyrene, 2,4-dimethyl styrene, butadiene, dichlorobutadiene, isoprene, alkyl acrylates, alkyl methacrylates, vinyl naphthalene, vinyl pyridine, etc.

Where the polymerization is carried out in the polyol, and the like active-hydrogen-containing medium, it has been found that a reaction apparently occurs between the solvent and the polymer chain being formed whereby the solvent molecule is attached to the chain. Thus, the solvent molecule incorporated into the polymer chain in this matter itself provides reactive hydrogen groups to the polymer. In this manner polymers may be prepared from ethylenically unsaturated monomers, which monomers themselves contain no reactive hydrogen groups, so long as the polymers are prepared by polymerization in the active-hydrogen-containing solvent. The polymers so prepared will be reactive and probably contain reactive hydrogen groups even though the ethylenically unsaturated monomers used for their preparation themselves contain no reactive hydrogen groups. From this fact it appears that the reactive solvent used in the polymerization probably acts as a chain transfer agent thus entering into the polymer chain probably as a terminal radical. If this is the case, then the length of the chain and thus the equivalent weight of such a polymer will depend on the chain transfer coefficient of the medium or solvent and on the manner of preparation and type of polymer made. By this means reactive radicals containing reactive hydrogen can be introduced by proper selection of the reactive solvent used as the medium for the polymerization. The distribution of reactive radicals in the film-forming polymers is, of course, not limited to terminal positions. On the contrary, such radicals may be at various positions from the entire polymer chain. It is preferred, however, in addition to carrying out the polymerization in the reactive solvent, to use as one of the monomers a material which itself contains a reactive hydrogen group which allows a much wider range of frequency of reactive radicals and produces polyurethane products with improved characteristics.

The type of nitrogen bond between the polyisocyanate and the film-forming polymer can be varied at will by proper selection of the reactive radical on the polymer chain. The chemistry of formation and significance of the type of bonding are known in the art as described, for example, in "Block and Graft Polymers" by William J. Burlant and Allan S. Hoffman, Reinhold Publishing Company (1960), pp. 79–90.

If the reactive radical in the polymer is a nitrogen derivative, it will also act as a catalyst for the polyurethane formation. Where the reactive radical is carboxyl, it may be desirable to modify the structure of the film-forming polymer for certain purposes. More specifically, it is well known that the reaction product of the —COOH and —N=C=O radicals is an amide plus $CO_2$. This reaction is desirable for foam production but is frequently undesirable when porosity in the finished product is to be avoided. It is a feature of the present invention to avoid porous product formations in such a situation by reacting a salt-forming nitrogen derivative with the carboxyls of the film-forming polymer so as to change the reaction mechanism of the components. (See, for example, applicant's copending application Ser. No. 117,488, filed May 12, 1961, now U.S. Pat. No. 3,219,639, issued Nov. 23, 1965.) For example, a primary or secondary amine may be introduced, which will result in the formation of a urea linkage with the —N=C=O radical. Similarly, amino alcohols may be introduced, in which case the hydroxyl group will react with the —N=C=O to form urethane linkages. In these cases, a non-porous film or mass can be obtained with the substituted —COOH radical. The —COOH radical can also be reacted with a polyamine containing at least two free amino groups. The available primary amino group(s) may then be reacted with phosgene to form an isocyanato group so that the material thus obtained would be an isocyanato-containing prepolymer.

The combining weight of the polymer (with respect to the polyisocyanate with which it is to be reacted) will play an extremely significant part in the properties of the polyurethane reaction product since the frequency of the reactive radicals will determine the location and also the number of bonds formed in the reaction between the polymers and the polyisocyanate. More specifically, in order to obtain the most highly useful product following the isocyanate reaction, the reactive film-forming polymer should contain such a minimum number of reactive radicals so that the combining weight of the polymer is not too high, viz., preferably below 4000. Although in certain cases higher combining weights also gave good products, generally speaking, the higher the combining weight, the softer, more elastic the reaction product; the lower the combining weight, the more rigid the reaction product will be, using the same major components in the product.

The optimum combining weight for a given reactive polymer (to produce an end product having the most desirable properties) may readily be determined by simple experimentation. Since the combining weight of a given polymer reflects both the particular monomers used in the formation of the polymer as well as the mol ratios of such monomers, it is a simple task to tailor the polymer to a specific, desired combining weight through the proper choice of these variables.

Where the only groups of the polymer or copolymer which are reactive with the isocyanato group are those obtained by attaching molecules of the reactive solvent to the polymer chain, the number of bonds formed in the reaction between the polymers and the polyisocyanate cannot be accurately predicted in advance. Thus, the optimum concentration for any particular property can only be determined by experimentation.

Regardless of which type of polymer is employed to form the reactive solutions of the present invention, the film-forming polymers should be present in dispersions or solutions in a reactive solvent and the reactive solutions or dispersions formed from said polymers preferably are dilutable with such solvent. Where the solution or dispersion is not dilutable, the polymer should be prepared in the solvent at the concentration desired for the ultimate use so that dilution is unnecessary. The molecular weight of the film-forming polymers of the present invention will necessarily vary within reasonably wide limits depending upon the particular polymer used. The molecular weight is only a rough indication of whether a polymer is a film-former. The film-forming ability of a polymer is determined primarily by its cohesive energy. Conventionally a polymer is considered to be a film-forming polymer if the cohesion in the polymer itself is great enough to produce a film above the "glass" temperature, i.e., above the second order transition temperature. In general, the film-forming polymers will have a molecular weight above 5000, best properties being obtained with film-forming polymers having molecular weights of 10,000 or greater. The upper molecular weight limit is one selected for practical considerations: the molecular weight of the polymer must not be so high that an approximately 10% solution formed by dissolving the polymer in the reactive solvent will not be free flowing at the temperature at which reaction with the polyisocyanate is carried out, i.e., the solution should have a viscosity at that temperature of less than about 40,000 cps.

As is evident from the list of monomers which may be used to form the film-forming polymers of the present invention, film-forming polymers having either aromatic or aliphatic nuclei (or both) may be employed. The choice of the particular nucleus is dependent upon the final desired properties of the polyurethane. For example, film-forming polymers having predominantly aromatic nuclei will tend to produce stiffer products; those with predominantly aliphatic nuclei will tend to produce softer products. In general, the physical properties of the polymer will reflect in the polyurethanes.

The second essential component of the novel reactive uniform solution or stable dispersion of the present invention is a reactive solvent for the film-forming polymer. The "reactive solvent" of the instant invention is the "active-hydrogen-containing material" known in the art and conventionally used in preparing polyurethane resins.

The reactive solvent must be selected to meet several diverse requirements:

(1) It must act as a solvent or dispersing medium for the film-forming polymer.

(2) It must not be so reactive with the film-forming polymer as to form a gel or a hard infusible resin which would interfere or even prevent the reaction with the polyisocyanate or would substantially reduce the active hydrogen radical content of either the solvent or the polymer. Where the film-forming polymer is prepared by polymerizing the monomers in the reactive solvent itself, other than acting as a chain transfer agent (causing grafting or some form of attachment between solvent molecules and the developing polymer chains), under the conditions necessary for the polymerization reaction the solvent should not be reactive, other than to a negligible degree, with the monomers or the polymer produced. By "negligible degree" is meant that there does not occur any gel formation or production of a hard infusible resin which would interfere or prevent the reaction with the polyisocyanate or would substantially reduce the active hydrogen radical content of either the polymer or the solvent.

(3) It should form stable solutions or dispersions with the film-forming polymer which are preferably dilutable without the formation of undesirable precipitates with the components used to form the polyurethane polymer.

(4) It must be a liquid (at least at the temperatures used for the reaction with the polyisocyanate) with a relatively limited molecular weight.

(5) It must have at least two radicals which are reactive with the —N=C=O of the polyisocyanate so as to form a polymeric reaction product with the polyisocyanate.

The preferred solvents are the polyols as described above. While the usable polyols are not so restricted, illustrative polyols are glycols, triols, tetrols, polyglycols, ether alcohols, polyesters, and polyesteramides and like liquids having a molecular weight of at least about 500. While the polyols are preferred, other solvents having active hydrogen producing radicals such as —COOH, —SH, etc. and a molecular weight of at least about 500 may be used. The preferred ethers contain the structure $$H(OR)_nOH$$

wherein R is a hydrocarbon radical and n is an integer sufficiently high to give a molecular weight of preferably from about 500 to 5000. Such ethers can be prepared by condensing an alkylene oxide such as ethylene oxide or propylene oxide or a mixture thereof with each other or with other alkylene oxides as styrene oxide, etc. to provide a product having terminal hydroxide groups. Condensation products may also be prepared by condensing such alkylene oxides with diols, triols, etc., such as pentanediol-1,5; 2-ethylpropandiol-1,3; 2-methylpropanediol-1,3; hexanediol; 3,4-dihydroxycyclopentane and its polyethers; xylene, $\alpha,\alpha'$-diols; trimethylol propane; hexane triols and triols. Small amounts of such low molecular weight polyols, as up to about 10% by weight of the solvent, may be added either to modify the properties of the polyurethanes produced from the solutions or assist in dissolving the film-forming polymer.

The polyesters suiable for use as polyols in the present invention are generally formed from glycols and dicarboxylic acids or other derivatives thereof by a simple condensation reaction and the resulting products are primarily linear, although small amounts of cross-linking agents such as tricarboxylic acids, glycerol or unsaturated acids may be used to produce a variation in the final product. When the film-forming polymer is prepared by polymerization in the polyester, the presence of unsaturated acids or glycols in the polyester is undesirable. Saturated aliphatic dicarboxylic acids such as adipic, succinic, glutaric, pimelic, suberic, azelaic, sebacic, malonic and the like may be employed with aliphatic glycols such as ethylene glycol, diethylene glycol, triethylene glycol, decamethylene glycol and 1,12-octadecanediol. Cyclic diols and triols may also be used. Aromatic acids such as isophthalic, p-phenylenediacetic acid, etc., and alicyclic acids such as hexahydroterephthalic acid map likewise be used. An excess of the glycol is used so that the polyester has terminal alcoholic hydroxyl groups.

Further examples of suitable polyesters and polyethers for use as the polyol of the present invention are described in U.S. Pats. 2,814,606; 2,801,990; 2,801,648; 2,777,831; 2,606,162 and 2,432,148. The patents also teach the method of preparing such polyols. *U.S. Pat. 2,801,990 describes polyester polyols and polyester-amide polyols at columns 8 and 9 having hydroxyl numbers from 30 or 40 to 100 or 140.*

The polyester polyols will be suitable solvents for types of polymers which are insoluble in polyols consisting of polyethers. Other polyols known to the art, for example, as discussed above in the discussion of the prior art, may be used to provide a wide range of solubilities for the film-forming polymers as well as a variety of properties in the final polyurethane resin.

The reactive solution (comprising the film-forming polymer dissolved in the polyol) should contain a minimum of about 5–10% by weight of the polymer, a preferable concentration being about 20–50% by weight. Solutions ihaving in excess of 50% by weight of the film-forming polymer are ordinarily too viscous for practicable purposes.

The isocyanates used to form the polyurethanes of the present invention must be polyfunctional. Examples of such polyisocyanates are tolylene diisocyanates, hexamethylene diisocyanates, diphenylmethane diisocyanates, naphthalene diisocyanates, triphenylmethane triisocyanates, phenylene diisocyanates, bitolylene diisocyanates, dianisidine diisocyanate, dimethyldiphenylmethane diisocyantes, triisocyanatodiphenyl ethers, etc., such as metatoluene diisocyanate, 4,4'-diphenyl diisocyanate, 4,4'-diphenylene methane diisocyanate, 1,5-naphthalene diisocyanate, 4,4'-diphenyl ether diisocyanate, p-phenylene diisocyanate, ethylene diisocyanate, trimethylene diisocyanate, cyclohexylene diisocyanate, 2-chloropropane diisocyanate, 2,2'-diethylether diisocyanate, 3-(dimethylamine) pentane diisocyanate, tetrachlorophenylene diisocyanate-1,4, etc. A more complete list of polyisocyanates is set forth by Siefken in Annalene, 562, pp. 122–135 (1949). The function of the isocyanates is such that these are interchangeable although their choice is important for the production of an end product.

The polyisocyanates react both with the film-forming polymer and the solvent so that the polyurethanes formed using the reactive solutions of the instant invention incorporate both of these elements into the chemical structure of the polyurethane. Thus the resulting polyurethanes constitute a novel group of polymers having substantially different properties than could be obtained by a mere mechanical mixture. Where the film-forming polymer is formed by the polymerization of one or more ethylenically unsaturated monomer in the reactive solvent, as has been stated, the polymer contains some solvent molecules chemically attached to the polymer chain. This type of chemical attachment is by grafting or by chain termination and is to be distinguished from reactions between the active hydrogen groups of the solvent and the monomer (as can be seen, for example, by using a monomer or monomers which do not themselves contain an active hydrogen group). It is also to be distinguished from the cross-linking obtained by the use of a solvent which itself contains an ethylenically unsaturated linkage. The new film-forming polymers have significantly different properties from the polymer formed by the same monomer or monomers polymerized under conditions such that the reactive solvent molecules are not incorporated into the polymer chain. It has been found that the polymer prepared by polymerization in the reactive solvent and then separated from the reactive solvent (as by precipitation with a non-solvent), could not be redispersed in the reactive solvent even at elevated temperatures. The polyurethanes produced using such reactive solutions comprise not only bonds between the polyisocyanate and the separate reactive groups of the film-forming polymer and the solvent, but also comprise direct chemical bonds between the polymer and the solvent. Thus, such polyurethanes comprise a variety of chemical bonds with consequent effect on the physical and chemical properties of the polyurethanes.

The reactive solutions of the present invention may be used in place of the polyols of the prior art in any of the processes used in preparing polyurethanes. Thus, the solutions may be used in the prepolymer process, the quasi-prepolymer process or the one-shot process. The polyurethanes may be further reacted with epoxy resins, cured with sulfur, peroxides or other curing agents, or otherwise reacted or modified as known to those skilled in the art. In using the one-shot process, as described for example in U.S. 2,866,774 to Price, it is desirable to use a silicone oil emulsifier as described in U.S. 2,834,748 and 2,917,480.

To form the polyurethanes of the present invention, an excess of the polyisocyanate should be employed. In general, the ratio between the —N=C=O radicals and the other reactive radicals in the reactant mass (including those in the film-forming polymer, the polyol and the other non-isocyanate reactants, if any) should be from about 1–5 to 1 and, in exceptional cases, up to 6 to 1.

As aforestated, the viscosity of the reactive solution (comprising the film-forming polymer and the polyol in the ratio desired) generally should be less than about 40,000 cps. under conditions of use. Generally speaking, the viscosity of the reactive solution should be such that the solution is dilutable upon simple mixing with additional quantities of polyfunctional liquid reactants used. The viscosity of the reactive solution should also be low enough to permit easy mixing of the isocyanates with the reactive solution. In the term "solution" as used herein in the specification and claims there are included dispersions of the film-forming polymer in which the polymer shows marked solvation as indicated by a viscosity increase and wherein the polymer does not separate from solution on storage or during conventional handling.

In carrying out the process of the present invention, the solution of the film-forming polymer dissolved in the polyol is first prepared and then mixed with the polyisocyanate and any other reactants which it is desired to take part in the polyurethane-forming reaction. For example, it may be desired to vary the quantity of reactive, non-isocyanate radicals in the reactant mass by adding other active hydrogen-containing compounds. The polyurethane finished product is believed to be a graft polymer.

Because of the great many variables involved in the process of the present invention, i.e., the desired properties of the finished product, the combining weight of the reactants, the type of bonding desired, the solubility requirements (including the possibility that certain materials will cause an undesirable precipitate to form in the reactive solution), the selection of particular film-forming polymers, solvents and other additives to be employed in the reaction must, in good part, be done on an experimental basis. The complete flexibility of the instant process, however, makes possible the easy adjustment of the reactant mass to conform it to one having desired characteristics.

This invention is furthermore illustrated by the following examples without, however, being restricted thereto. All parts are by weight, unless otherwise specified. Unless otherwise stated in the examples the polymerization reactions were carried out in a three-necked flask equipped with an agitator, a reflux condenser, a thermometer, the three-necked flask being connected to a nitrogen cylinder. Prior to the addition of the catalyst, the contents of the flask were purged with nitrogen for 30 minutes and heated. After completion of the reaction, toluol was added and the traces of water remaining in the flask were removed by azeotropic distillation. The reaction was carried out to an unreacted monomer content of 5% maximum.

EXAMPLE 1

The flask was charged with 220 g. styrene of 99% purity inhibited with 0.02% of t-butylcatechol, 125 g. 2-ethylhexyl acrylate of 99% purity inhibited with 0.05% hydroquinone and 400 g. of Pluracol P2010 (a polypropylene ether diol terminated with two hydroxyl radicals, having a molecular weight of 2000 and combining weight of 1000 and made by the Wyandotte Chemical Co.). After raising the temperature of the flask to 70° C., 1½ g. of azobisbutyronitrile catalyst were added. The polymerization reaction was then carried out at 130° C. for 3 hours.

The result of the reaction was a viscous solution having 1.3% unreacted styrene and 2½% of ethylhexyl acrylate. The combining weight of the solution was 1800. The solution could not be diluted with other polyols but could be diluted with aromatic and chlorinated hydrocarbons.

EXAMPLE 2

The product of Example 1 was used to form a cellular polyurethane product with tolylene diisocyanate having a composition of 80% 2, 4 and 20% 2,6 substitution and having an equivalent weight of 87. The conventional ratio between the —N=C=O radicals and the other reactive radicals (such as hydroxyl and carboxyl) was adjusted to 2.8. Hereafter, NCO/X will be used to express this ratio, X being the sum of the equivalents of all the non-cyano reactive radicals. The amount of water was calculated to give a low density foam.

The product of Example 1 could only be used without dilution; otherwise, solidification took place. To 50 grams of the compound of Example 1, ½ gram of a surface-active silicone oil was added as a foam stabilizer and to this mixture 1 gram water and ½ gram N-ethyl morpholine was added, the latter serving as a catalyst. Seven grams of the diisocyanate were then added to this mixture, resulting in the formation of a very viscous material whose volume expanded only slightly and which slowly set to a solid. After 24 hours at 70° C., the material had very little strength and appeared to be inferior to conventionally made products.

EXAMPLE 3

The process of Example 1 was repeated using 55 gm. styrene, 31 gm. 2-ethylhexyl acrylate and 300 gm. Pluracol P2010. The polymer content of the solution was 22% which is about half the polymer content of the solution in Example 1. The reactive solution of Example 3 was dilutable with further additions of Pluracol P2010 without solidification or other adverse effect.

EXAMPLE 4

To 100 gm. of the reactive solution of Example 3 are added 0.25 gm. tin octoate, 2.0 gm. surface active silicone oil, 0.2 gm. N-methyl morpholine, 0.1 gm. N,N,N,N-tetramethyl butanediamine, 3.5 gm. water and 35 gm. tolylene diisocyanate. An excellent polyurethane foam was obtained having a density of 2.4 lbs./c. ft. and a compression set (ASTM) of 40%.

EXAMPLE 5

The flask was charged with 220 gm. styrene, 125 gm. 2-ethylhexyl acrylate, 32 gm. glacial acrylic acid and 500 gm. of Pluracol P2010 (the polypropylene ether diol used in Example 1). The polymerization was carried out under the same conditions used in Example 1, again utilizing 1½ gm. of azobisbutyronitrile as a catalyst.

The resulting polymer solution had 1.3% unreacted styrene, 2% ethylhexyl acrylate and 0.7% acrylic acid. The combining weight for the carboxyl radical was determined by titration of the alcoholic solution with 2NKOH. The figure determined for the solution was 2950 which, if calculated for the polymer content, was 1200. The combining weight for all the reactive radicals in the solution (carboxyls and hydroxyls) was 1060. The polymer content of the solution was 41%. This solution could be diluted without difficulty with polyhydric alcohols and was compatible with the polyisocyanates.

EXAMPLE 6

25 grams of the reaction product of Example 5 and 25 grams of a polyoxypropylene triol derived from trimethylol propane and having a molecular weight of 2600, a hydroxyl number of 63 (mg. KOH/gm.), a viscosity of 440 cps. at 25° and a combining weight of 890, were mixed together. A uniform solution with a viscosity of 11,000 cps. was obtained.

As in Example 2, ½ gram silicone oil, 1.2 grams water and .5 gram N-ethyl morpholine were mixed into the liquid and 12½ grams of diisocyanate added. The mixture was poured into a mold of 880 ml. capacity which was filled in 6 minutes with the foam generated by the chemical reaction. The reaction product solidified in 20 minutes. After a 24-hour cure at 70° C., the product showed little shrinkage, uniform small cells and low tensile strength.

EXAMPLE 7

The reaction was carried out under the conditions and procedure of Example 1, the charge of the flask being:

| | Gm. |
|---|---|
| Styrene | 220 |
| Ethylhexyl acrylate | 125 |
| Glacial acrylic acid | 128 |
| Pluracol P2010 (the polypropylene ether diol of Example 1) | 600 |
| Azobisbutyronitrile | 3 |

Unreacted monomers were: styrene—1%; ethylhexyl acrylate—2.1%; acrylic acid—1%. The carboxyl equivalent weight for the solution was 790 and for the polymer itself 325. The combining weight of the solution (for the cyanato radical) was 520. The viscous solution was compatible with polyols, polyethers and other reactive additives known to be useful for making polyurethanes.

EXAMPLE 8

25 grams of the reaction product of Example 7, 25 grams of the triol in Example 6 and ½ gram of the silicone oil were mixed together. The solution obtained had a viscosity of 15,000 cps., 1.8 grams water and .5 gram N-ethyl morpholine were mixed with this solution, after which 18½ grams of the diisocyanate were added. A foam slowly formed in a mold of 1200 ml. capacity which was finally filled to the top by the foam. The foam solidified to a resistant solid in 25 minutes. After 24-hour curing at 70° C., an excellent cellular material with very high load-bearing capacity, excellent texture and good strength was obtained. This material was far superior to the control in the next example.

EXAMPLE 9

Conventional polyols were used in this experiment while maintaining the NCO/X ratio at 2.8 and using the same water and isocyanate ratio as before. 25 grams of Pluracol P2010, 25 grams of the triol previously used and ½ gram of silicone oil were mixed together. A solution of low viscosity of 480 cps. was obtained to which 1.45 grams water and ½ gram of N-ethyl morpholine were added and, subsequently, 13.5 grams of the diisocyanate. The liquid mixture was poured into a mold of 800 ml. capacity. On foaming, a considerable part of the $CO_2$ gas escaped and only half of the 800 ml. capacity of the mold was filled with the foam. To obtain a somewhat resilient product, the foam had to be cured for one week at 70° C. The product had a very coarse cell structure.

EXAMPLE 10

A copolymer was prepared using methyl methacrylate as one of the reactive monomers, as follows:

| | Gm. |
|---|---|
| Methyl methacrylate | 300 |
| 2-ethylhexyl acrylate | 100 |
| Acrylic acid | 60 |
| Pluracol P2010 | 500 |

As a catalyst, 2 gm. azobisbutyronitrile and 1 gm. benzoyl peroxide were used. A viscous solution resulted, which could be used in the same manner as the products in Examples 5 and 7. This solution had a combining weight of 1200 and gave a foam of better quality than the styrene terpolymer in Example 5.

In this example, all the ingredients used in the polymerization were of an aliphatic nature.

EXAMPLE 11

A copolymer was prepared using a hydroxy comonomer. Such a polymer is reactive with the isocyanate radical, forming urethane linkages. Such a reaction does not produce a gas and the reaction product with the isocyanate is suitable for making continuous films or nonporous castings.

For carrying out the polymerization, the reaction flask was charged with:

| | Gm. |
|---|---|
| Styrene | 220 |
| 2-ethylhexyl acrylate (whose molecular and combining weight was 130; 97.6% purity) | 124.5 |
| Hydroxyethyl methacrylate | 64 |
| Pluracol TP 440 (a triol of a molecular weight of 400 and combining weight of 133) | 400 |

The reaction product was a viscous solution with a combining weight for the hydroxyl of 230.

EXAMPLE 12

The same formula was used as in Example 11 except that Pluracol P2010 was used in lieu of Pluracol TP 440. Again, a viscous solution was obtained, with a combining weight of 880.

EXAMPLE 13

The following ingredients were mixed for the polymerization reaction:

| | Gm. |
|---|---|
| Methyl methacrylate | 300 |
| 2-ethylhexyl acrylate | 100 |
| Hydroxyethyl methacrylate | 25 |

-continued

| | |
|---|---|
| Pluracol P1010[1] | 500 |

[1]A diol with a molecular weight of 950, a combining weight of 475, a viscosity of 75 cps., and corresponding to the formula of the other polypropylene glycols. As a catalyst 3 grams of azobisbutyronitrile were used.

The end product was a very viscous solution with a combining weight for the OH radical of 725 and having 2% unreacted acrylic esters.

While the solution was very viscous, it could be diluted with such polyols as those conventionally used for polyurethane reactions.

EXAMPLE 14

To make a cellular compound, the product of Example 12 was reacted with an isocyanate while using a catalyst which was primarily active in catalyzing the reaction between the isocyanate and hydroxyl, a tin octoate. The NCO/OH ratio was 4.

25 grams of the solution from Example 12 was mixed with 25 grams of a triol with a molecular weight of 4000 (Pluracol TP 4040 of the Wyandotte Chemical Company). A solution with a viscosity of 15,000 cps. was obtained which could be easily processed. 0.5 gram silicone oil emulsifier (polysiloxane-polyalkylene block copolymer having an average molecular weight of about 7000) was mixed in to improve the foam stability. 15.5 grams tolylene diisocyanate (sold as Hylene TM by E. I. du Pont de Nemours & Co., Inc., and which is a mixed isomer consisting of 80% 2,4- and 20% 2,6-substituted product) was added thereafter. This addition reduced the viscosity of the material to 3000 cps. and allowed easy mixing with the rest of the compounding ingredients needed for the formation of the cellular product, as follows:

| | Gm. |
|---|---|
| Tin octoate | 0.2 |
| Water | 1.4 |
| N-ethyl morpholine | 0.5 |

A foam was produced which, after being cured for 30 minutes at 80° C., was fully solidified and could be removed from the mold. The density was 2 lbs. per cubic foot, cells small and uniform (about 0.5 mm. diameter), compression deflection (RMA) at 25% compression after 5 days aging was 36 lbs. The latter figure was much higher than that of a foam made by substituting for the polymer solution in the above formula a diol (Pluracol P2020 of the Wyandotte Chemical Company) which had a similar density and only 15 lbs. RMA compression deflection at 25% compression.

EXAMPLE 15

The film properties of the reaction product of Example 12 were studied as follows: 25 grams of the polymer solution of Example 12 and 25 grams of Pluracol TP4040 were compounded with 4.5 grams tolylene diisocyanate (used as before), which combination gave an NCO/OH ratio of 1.1. This solution remained liquid for 24 hours after which it began to gel. A film was cast and allowed to set at 60° C. for 3 days while exposed to moisture in the air. The 0.5 mm. film which was obtained had a tensile strength of 3500 lbs./sq. inch and an elongation of 80%.

EXAMPLE 16

Using 25 grams of Pluracol TP4040, 25 grams of Pluracol P2020 and 4.5 grams tolylene diisocyanate, a solution was obtained which remained unchanged in a closed container for over one week. A film was cast as previously done, which film only set after 5 days. After 7 days exposure to air, the film had a tensile strength of 800 lbs./sq. inch and an elongation of 20%. It was much softer and rubbery than the product containing the polymer compound of Example 12.

EXAMPLES 17–31

The following polymer solutions are usable in connection with the instant invention. In each case the film-forming polymer contains radicals reactive with the cyanato radicals. The polymerization catalyst used in these reactions was 0.25% azobisbutyronitrile calculated on the monomers.

| Example No. | Monomers | Quantity (grams) | Solvent | Quantity (grams) |
|---|---|---|---|---|
| 17 | Vinyl acetate<br>2-Ethylhexyl acrylate<br>Acrylic acid | 300<br>60<br>60 | Pluracol P2010 | 900 |
| 18 | Itaconic acid ($H_2SO_4$ 0.2 grams) | 100 | Pluracol P1010[1] | 200 |
| 19 | Styrene<br>Itaconic acid | 130<br>52 | Pluracol P410[2] | 230 |
| 20 | Styrene<br>2-Ethylhexyl acrylate<br>Itaconic acid | 220<br>124<br>62 | Pluracol P2010 | 500 |
| 21 | Styrene<br>Di-n-butyl itaconate<br>Itaconic acid | 100<br>52<br>48 | " | 210 |
| 22 | Butyl acrylate<br>Acrylic acid | 220<br>72 | " | 300 |
| 23 | Butylaminoethyl methacrylate | 124 | " | 400 |
| 24 | Methyl methacrylate<br>2-Ethylhexyl acrylate<br>Hydroxyethyl methacrylate | 300<br>100<br>64 | " | 500 |
| 25 | Styrene<br>Methacrylic acid | 260<br>148 | Pluracol P410 | 500 |
| 26 | Styrene<br>Acrylic acid | 260<br>148 | Pluracol P2010 | 500 |
| 27 | Styrene<br>Acrylic acid | 260<br>148 | Pluracol P1010 | 500 |
| 28 | Styrene<br>Acrylic acid | 260<br>148 | Pluracol P410 | 500 |
| 29 | Vinyl acetate<br>2-Ethylhexyl acrylate<br>Hydroxypropyl methacrylate | 450<br>25<br>25 | PPG 2025[3] | 500 |
| 30 | Styrene<br>2-Ethylhexyl acrylate<br>Hydroxypropyl methacrylate | 110<br>62<br>16 | LG 56[4] | 210 |
| 31 | Vinyl propionate<br>Hydroxypropyl methacrylate | 570<br>30 | LG 56 | 610 |

[1]A polypropylene glycol of 1,000 molecular weight and 500 combining weight.
[2]A polypropylene glycol of 400 molecular weight and 200 combining weight.
[3]A polypropylene glycol with a OH equivalent of 56 mg KOH/gm. and an average mol. wt of 2,000.
[4]A polyoxypropylene triol with a OH equivalent of 55.5 mg. KOH/gm. and an average mol. wt. of 3,000.

EXAMPLE 32

In this example the film-forming polymer was made from monomers which did not have an active hydrogen in the ethylenically unsaturated monomers themselves. The polymerization was carried out under the conditions and procedure of Example 1, the charge of the flask being:

| | G. |
|---|---|
| Vinyl acetate | 700 |
| 2-ethylhexyl acrylate | 27 |
| LG 56 | 800 |
| Azobisbutyronitrile | 0.75 |

After the polymerization was completed and the flask cooled, a viscous solution was formed which could be further diluted with the LG 56. The solution had a hydroxyl equivalent of 24.5 mg. KOH/gm. and a free vinyl acetate content of 0.1%. No free acrylic ester could be detected. The polymer content of the solution was 47.5%. The viscosity of the solution after dilution with an equal amount of LG56 was 4000 cps.

A sample of the solution was treated with petroleum ether which precipitated the polymer from the polyol solution. The precipitate was separated by filtration and then extracted in a Soxhlet extractor using additional petroleum ether. The polymer was then dissolved from the filter paper with acetone and after evaporating the acetone was weighed. The precipitated polymer so obtained constituted 51.3% of the weight of the polymer solution. Based on the monomer content of the solution of 47.5%, this indicated that 7.8% of the polymer was due to the molecules of the polyol attached to the polymer chains. The calculated equivalent weight of the polymer was then about 14,000. The reduced viscosity calculated from measurement in a 2.5% acetone solution was 0.28.

To determine the reactivity of the solution with an isocyanate, the following ingredients were reacted:

| | Gm. |
|---|---|
| Polymer solution (no dilution) | 100 |
| Silicone oil emulsifier | 2 |
| Tetramethyl butane diamine | 0.1 |
| Water | 3.5 |
| Tolylene diisocyanate | 40.7 |

A cellular product was obtained as before. After aging for 48 hours at room temperature, the cellular product was shredded and then extracted with acetone in a Soxhlet extractor. The acetone extract was 3.9% by weight of the weight of the original cellular product, indicating that the polymer contained active hydrogen radicals which had chemically reacted with the isocyanate. When the same monomers were polymerized in a volatile solvent, then dispersed in the LG 56 and the resulting polymer solution in the LG 56 made up into a cellular product using the same formula as above and extracted with acetone, it was found that 90% of the polymer in the cellular product was removed by the acetone extraction.

A cellular product was made as in Example 2 using the following ingredients:

| | Gm. |
|---|---|
| Polymer solution | 50 |
| LG 56 | 50 |
| Silicone oil emulsifier | 2 |
| Tetramethyl butane diamine | 0.1 |
| Tin octoate | 0.35 |
| Water | 3.5 |
| Tolylene diisocyanate | 41.8 |

All of the ingredients, except the diisocyanate were first mixed and then the diisocyanate mixed in over a period of about 30 seconds. In about 10 minutes the product had set to a solid mass. After aging for 3 days at room temperature it was tested, using as the control a product prepared using the same formula, but containing 100 gm. of the pure LG 56 and with 44.5 gm. of the diisocyanate (the larger amount of the diisocyanate was needed to compensate for the higher hydroxyl equivalent of the pure LG 56). The results are tabulated as follows:

| | Example 32 | Control |
|---|---|---|
| Density (lbs./c. ft.) | 1.90 | 1.82 |
| Indentation load (lb./sq. ft.): | | |
| Compression 25% | 1.2 | 0.76 |
| Compression 65% | 2.5 | 1.4 |
| Compression 90% | 18.8 | 8.5 |
| Compression set (90% compression), percent | 8.7 | 9.2 |
| Acetone solubility, percent | 4.8 | 2.8 |

These results indicate that the film-forming polymer contained reactive hydrogen radicals by reason of the chemical attachment of the polyol molecules with the result that the polyisocyanate polymer was combined chemically with the polyisocyanate, thereby giving a polyurethane product of improved properties.

EXAMPLES 33–36

Following the same procedure as in Example 32, the following polymer solutions were prepared which were useful for the same purpose as those set forth above:

| | Parts by Weight | | | |
|---|---|---|---|---|
| Ex. Nos. | 33 | 34 | 35 | 36 |
| Ingredients: | | | | |
| Vinyl acetate | 162 | 171 | 173 | 175 |
| 2-ethylhexyl acrylate | 18 | 9 | 7 | 4.5 |
| Pluracol P2010 | 200 | 200 | 200 | 200 |

EXAMPLE 37

A reactive solution was prepared using the following ingredients:

| | Gm. |
|---|---|
| Acrylonitrile | 370 |
| Hydroxyethyl methacrylate | 18.4 |
| Pluracol TP2540 (a triol derived by reacting polyoxypropylene with trimethylol propane and having a molecular weight of 1500–1700 and a hydroxy number of 63) | 600 |
| Azobisbutyronitrile | 1 |

The reaction vessel (as described in Example 1) was charged with the polyol which was heated to 80° C. under a nitrogen blanket. The catalyst was then added and the monomers fed to the polyol at a continuous rate. The reaction started immediately and the temperature and viscosity of the solution increased significantly. After completion of the polymerization a thick, yellow-brown solution was obtained, indicating that the polymer was in the form of a fine dispersion. The resulting reactive solution had a viscosity of about 31,000 cps. and contained 0.3% unreacted acrylonitrile. The solution was readily diluted with additional Pluracol TP2540 to reduce the viscosity to about 20,000 cps. The dispersion was stable on storage and easily processed as described in Example 32 to give a cellular polyurethane foam possessing excellent physical properties.

EXAMPLE 38

A reactive solution was prepared using the following ingredients:

| | Gm. |
|---|---|
| Acrylonitrile | 370 |
| Acrylic acid (glacial) | 50.1 |
| Pluracol TP2540 | 600 |
| Benzoyl peroxide | 1 |

The ingredients were polymerized as in Example 37. The resulting polymer solution was similar in appearance to that obtained in Example 37. The solution was diluted with additional polyol to lower the viscosity to about 11,400 cps. The solution contained only 0.05% unreacted acrylonitrile. The solution was stable on storage and easily processed to give a cellular polyurethane foam possessing excellent physical properties.

EXAMPLE 39

A reactive solution was prepared by reacting the following ingredients:

| | Gm. |
|---|---|
| Acrylonitrile | 200 |
| 2-Ethylhexyl acrylate | 100 |
| Acrylic acid | 72 |
| LG 56 | 550 |
| Azobisbutyronitrile | 1 |

The ingredients were polymerized as in Example 37, except that an additional increment of 0.25 gm. of catalyst was added after completion of the monomer addition and the solution heated to 115° C. for one more hour to remove any unreacted acrylonitrile. The resulting reactive solution was a thick, yellow-brown solution, stable on storage and dilutable with further additions of polyol. The solution was easily processed to give a cellular polyurethane foam possessing excellent physical properties.

The reactive solutions of Examples 37–39 are of particular interest in that if the polymerization process is modified so that the monomers are added in a single batch and then polymerization initiated, the resulting polymer precipitates from the polyol when formed. However, by adding the monomers incrementally, as shown, a stable, uniform dispersion is produced. In contrast to this, in the polymerization of the vinyl acetate and 2-ethylhexyl acryate as shown, for example, in Examples 33 through 36, the reverse is true. Thus, in this monomer system, incremental addition of the monomers as polymerization proceeds results in a copolymer which separates from the polyol on cooling, while adding the monomers in a single batch to the polyol and then carrying out the polymerization results in a uniform solution of the copolymer in the polyol.

EXAMPLES 40–44

The following polymer solutions are usable in connection with the instant invention. The polymerization catalyst used in these reactions was 0.25% azobisbutyronitrile calculated on the monomers.

| Example | Monomer | Quantity, parts | Solvent | Quantity, parts |
|---|---|---|---|---|
| 40 | Styrene | 53 | PPG 2025 | 156 |
| | 2-ethylhexylacrylate. | 30 | | |
| | Acrylamide | 17 | | |
| 41 | Styrene | 52 | PPG 425[1] | 92 |
| | 2-ethylhexylacrylate. | 29 | | |
| | t-butylamino methacrylate. | 19 | | |
| 42 | Vinyl propionate | 100 | PPG 2025 | 127 |
| 43 | Vinyl butyrate | 100 | PPG 2025 | 100 |
| 44 | Butyl acrylate | 75 | PPG 2025 | 100 |
| | Acrylic acid | 25 | | |

[1]A polypropylene glycol having an hydroxyl number of 265 and molecular weight of about 400.

In the above solutions the vinyl butyrate solution had a significantly higher viscosity than the vinyl propionate solution. The solution of Example 41 is also noteworthy in that the solution produced by the polymerization gelled somewhat; however, it was easily dilutable with further additions of the polyol.

EXAMPLES 45–48

A series of reactive solutions was prepared as in Examples 40 through 44, using in Example 45 a monomer mixture of 96 parts vinyl acetate to 4 parts 2-ethylhexyl acrylate; in Example 46 vinyl propionate; in Example 47 vinyl butyrate and in Example 48 vinyl 2-ethylhexoate. In each case the polyol used as the solvent for the polymerization was LG 56. A cellular polyurethane foam was then prepared from these reactive solutions using the procedures shown in Example 32. The resulting foams were then cut up into small pieces and extracted to constant weight in a Soxhlet extractor using acetone. A polyurethane was prepared from LG 56 without any polymer present and subjected to the same extraction to serve as a control. The results are set forth in the following table:

| Example | Total Polymer Content of Polyurethane (weight percent) | Amount extracted (wt. percent of sample) | Chemically bound polymer (percent) | Chemically bound polymer (corrected percent) |
|---|---|---|---|---|
| 45 | 32.5 | 3.9 | 87 | 95 |
| | 24.3 | 2.7 | 88.5 | 99 |
| 46 | 33.2 | 10.3 | 68.6 | 77 |
| | 25 | 4.7 | 81.5 | 91 |
| 47 | 25 | 3.4 | 86 | 96 |
| 48 | 25 | 3 | 88 | 98 |
| Control | | 2.4 | | |

Each of the polymers in these examples was prepared from monomers which do not contain an active hydrogen group which would be reactive with the isocyanato group. Thus these examples clearly show that some of the polyol has been chemically attached to the polymer with the result that a significant reaction occurs between the isocyanato group and the film-forming polymer in the polyol.

When the same procedure as in Example 32 is used to separate the polymer from the polyol, again an increase in weight of the recovered polymer was found indicating that some of the molecules of the polyol were attached to the polymer. Thus the polymers and copolymers produced by the solution polymerization of ethylenically unsaturated monomers in a polyol solution results in polymers which themselves have significantly altered properties than would be obtained if the polymerization were carried out in a completely inert solvent. At the same time the degree of reactivity is such that the polymerization of the monomers is not interfered with and proceeds to completion without gelling or other adverse effect.

EXAMPLE 49

An ester was prepared by heating azelaic acid and ethylene glycol in a ratio of 1 mol of acid to 2 mols of glycol and removing the water of condensation to yield a polyester having an acid number of 44 and a hydroxyl number of 244. Utilizing the polyester so formed as the solvent for preparing the reactive solution of the invention, 100 gm. of vinyl butyrate were added to 210 gm. of the polyester. The solution was heated under a nitrogen blanket to about 80° C. at which point it started to show substantial reflux. The catalyst was then added, in this case 0.5 gm. of azobisbutyronitrile. Upon completion of the polymerization there was obtained a clear solution having 0.46% unreacted monomer and possessing a hydroxyl equivalent of 172 which could be used as in preparing a rigid cellular polyurethane product.

EXAMPLE 50

A polyester was prepared as in Example 49 using 2 mols of azelaic acid and 3 mols of ethylene glycol. The resulting polyester had a relatively high viscosity, an acid number of 11 and a hydroxyl number of 48. To 200 gm. of the polyester there were added 150 gm. of vinyl butyrate and the monomer was polymerized as in Example 49, excepting that a higher concentration of catalyst was employed, in this case 1.5 gm. of the azobisbutyronitrile. Again a clear viscous solution was obtained which was suitable for making a cellular polyurethane product.

EXAMPLE 51

A commercial butylated melamine-formaldehyde resin (available under the trade name Cymel 247-10 from American Cyanamid) as a 60% resin solution in butanol was added to a polyol, in this case LG 56, and the butanol distilled over at 100° C. under a 40 mm. vacuum to give a 60% solution of the melamine resin in the triol. The solution had the consistency of honey and a hydroxyl number of 97.1. The melamine-polyol solution was diluted with an equal amount of LG-56 to give a solution having a viscosity of 12,000 cps. and a hydroxyl number of 72.5. A cellular polyurethane was prepared using 100 gm. of the diluted butylated-melamine-formaldehyde resin LG-56 solution to which was added 2 gm. of a silicone surface-active agent, 0.1 gm. N,N,N',N'-tetramethyl-1,3-butanediamine, 0.2 gm. tin octoate and 3.5 gm. of water. These ingredients were thoroughly mixed and then 47.5 gm. of tolylene diisocyanate were added rapidly under fast agitation. The mixture was poured out into a mold before considerable foaming had started. A stable, cellular foam was obtained which solidified in about 40 minutes. After 24 hours' standing the foam was fully set, had a density of 0.038 gm./cc. (2.3 lbs. per cubic foot); high compression characteristics and good elasticity.

EXAMPLE 52

10 gm. of ethyl cellulose with a substitution of 47.5 to 49% of ethoxy groups was dispersed in LK-250 triol and heated to 140° C. for 4 hours. A clear solution was obtained. The resulting reactive solution was made into a cellular polyurethane product following the process described in Example 51. The resulting polyurethane foam had a very low compression set of 6.2% (90% compression for 22 hours at 75° C. using the standard ASTM method).

When the ethylenically unsaturated monomer or monomers are polymerized in the reactive solvent, a free-radical catalyst such as azoisobutyronitrile, benzoyl peroxide, diisopropylbenzene hydroperoxide, lauroyl peroxide, cumene hydroperoxide, paramenthane hydroperoxide, diacetyl peroxide, di-t-butyl peroxide, di-alphacumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthale, propyl hydroperoxide, isopropyl hydroperoxide, n-butyl hydroperoxide, t-butyl hydroperoxide, cyclohexyl hydroperoxide, transdecalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha,alpha'-azo-2-methyl butyronitrile, alpha,alpha'-2-methyl heptonitrile, 1,1'-azo 1-cyclohexane carbonitrile, dimethyl alpha, alpha'-azo isobutyrate, 4,4'-azo 4-cyano-pentanoic acid, etc. is preferred. A mixture of catalysts may be used. Anionic catalysts and other polymerization catalyst systems which are stable in the presence of the reactants may be used.

In addition to the various previously mentioned advantages of the instant process and improved products, still additional advantages result from the practice of the present invention. For example, the use of a reactive solvent rather than a mere diluent makes unnecessary its removal from the finished product and avoids the shrinkage which invariably attends such removal.

A further advantage lies in the use of the solutions of the present invention to increase the viscosity of the composite mixture used for the production of the polyurethanes, which improves the flow properties of the liquids for most of the applications. When making cellular expanded type products, the high viscosity of the mixture will prevent premature escape of gases from the foam cells and a fine-textured product can be produced. Such premature escape of gases frequently causes difficulties in a "one-shot" process. As a result, the prior art limitation to the use of polyesters, polyethers and other prepolymers of high viscosity for the polyurethane reaction is removed. The film-forming polymers act as "bodying" agents in the relative solutions so that the so-called "one-shot" process can be used more effectively.

Still another advantage of the process of the present invention is the improvement in the load-bearing characteristics of foam products as well as the tensile strength and stability of the foam cells. When non-porous films are made, their hardness, flexibility, abrasion resistance, tensile strength, elongation, rebound and, in general, all of their physical properties can be favorably altered by using the process of the present invention. Thus, film-forming polymers may be easily combined chemically into the polyurethane to produce a new class of polymers having properties more valuable than either material alone. Plasticizers for the polymer component can be used. Other modifiers can be used such as polymers having reactive radicals, but not reactive with the NCO radical. In this latter case, the remaining reactive sites, such as double bond and unreacted carboxyls, can be used as additional cross-linking sites.

The extremely versatile nature of the process of the instant invention makes possible the production of products having a wide variety of characteristics, and can effectively be used for forming not only cellular polyurethane products, but films, coatings, cast or molded articles, etc. As is well known, cellular polyurethane products may be obtained by inducing the polyurethane reaction in the presence of a gas-producing agent or "blowing agent" such as water, fluorohydrocarbons, etc.

The term "polyurethane," when used in the specification and claims, is to be broadly construed to embrace the polymeric reaction product of isocyanates with compounds containing radicals reactive with the —N=C=O radicals of said isocyanates.

The invention may be embodied in other specific forms without departing from the spirit or essential characteristics thereof. The present embodiments are therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed is:

1. A method for preparing *elastic* polyurethanes comprising reacting (A) a liquid, stable reactive polymer-polyol mixture *convertible to an elastic polyurethane product* having a viscosity of less than about 40,000 cps. at 10% polymer concentration and having a combining weight in a range yielding elastic [ -to-rigid ] polyurethane products, the essential components of said reactive mixture consisting of (1) a substantial but minor amount of film forming polymer having a molecular weight of at least 5,000 and having a plurality of radicals containing active hydrogen atoms which are reactive with the —N=C=O radicals of an organic polyisocyanate and (2) a major amount of a solvent medium for said polymer consisting essentially of at least one normally liquid polyol essentially free from ethylenic unsaturation and having a molecular weight of at least about [ 500 ] *1000*, said polymer (1) being the polymerizate obtained by polymerizing, to a molecular weight of at least 5,000 and to a solids concentration of about 10% to about 50% by weight, an ethylenically unsaturated monomer in such polyol, with (B) an organic polyisocyanate to form such polyurethane, the ratio of the —N=C=O equivalents of (B) to the equivalents of reactive radicals of (A) being in the range of about 1-5 to 1.

2. A method in accordance with claim 1 for the production of a cellular polyurethane in which mixture (A) and polyisocyanate (B) are reacted while in intimate admixture with a blowing agent to provide simultaneously reaction of said mixture (A) and polyisocyanate (B) and formation of cells in the polyurethane reaction product.

3. A polyurethane comprising the reaction product of claim 2.

4. A method in accordance with claim 1 wherein said film-forming polymer is a polymer of an ethylenically unsaturated monomer containing an organic, nitrogen-containing radical in whih all of the nitrogen bonds are satisfied by bonds with at least one member selected from the group consisting of carbon and hydrogen.

5. A method in accordance with claim 4 in which said organic nitrogen-containing radical is an amino radical.

6. A polyurethane comprising the reaction product of claim 4.

7. A method in accordance with claim 4 for the production of a cellular polyurethane in which mixture (A) and polyisocyanate (B) are reacted while in intimate admixture with a blowing agent to provide simultaneously reaction of said mixture (A) and polyisocyanate (B) and formation of cells in the polyurethane reaction product.

8. A method in accordance with claim 7 in which the polymer concentration in reactive polymer-polyol mixture (A) is at least 10% by weight of said mixture.

9. A polyurethane comprising the reaction product of claim 7.

10. A polyurethane comprising the reaction product of claim 1.

11. A method in accordance with claim 1 in which the polymer concentration in reactive polymer-polyol mixture (A) is at least 10% by weight of said mixture.

12. A method in accordance with claim 1 comprising the additional step of diluting without substantial precipitation the reactive mixture (A) with additional reactants for the organic polyisocyanate prior to reaction with (B).

13. A method as defined in claim 1 wherein said film-forming polymer is a homopolymer resulting from the polymerization of an ethylenically unsaturated monomer containing at least one radical reactive with the

—N=C=O radicals of said isocyanate.

14. A method as defined in claim 13 wherein said ethylenically unsaturated monomer is selected from the group consisting of acrylic acid, methacrylic acid, crotonic acid, itaconic acid, 2-hydroxyethyl methacrylate, hydroxyethyl acrylate, hydroxypropyl acrylate, hydroxypropyl methacrylate, t-butylaminoethyl methacrylate, dimethylaminoethyl methacrylate, glycidyl acrylate, diglycol esters of itaconic acid, glycol monoesters of itaconic acid, methyl monoester of itaconic acid, allyl alcohol, maleic acid, fumaric acid, acrylamide and substituted acrylamide.

15. A method as defined in claim 1 wherein said film-forming polymer is a copolymer resulting from the polymerization of at least two ethylenically unsaturated monomers at least one of which contains at least one radical reactive with the —N=C=O radical of said isocyanate.

16. A method as defined in claim 15 wherein said ethylenically unsaturated monomer which contains at least one radical reactive with the —N=C=O radical of said isocyanate is selected from the group consisting of acrylic acid, methacrylic acid, crotonic acid, itaconic acid, 2-hydroxyethyl methacrylate, hydroxyethyl acrylate, hydroxypropyl acrylate, hydroxypropyl methacrylate, t-butylaminoethyl methacrylate, dimethylaminoethyl methacrylate, glycidyl acrylate, diglycol esters of itaconic acid, glycol monoesters of itaconic acid, methyl monoester of itaconic acid, allyl alcohol, maleic acid, fumaric acid, acrylamide and substituted acrylamide.

17. A method as defined in claim 15 wherein one of said ethylenically unsaturated monomers is selected from the group consisting of styrenes, butadienes, acrylic esters and vinyl esters.

18. A method in accordance with claim 1 in which a plasticizer for said film-forming polymer is added to the reactive mixture prior to reaction of said reactive mixture with the organic polyisocyanate.

19. A method in accordance with claim 18 in which said plasticizer contains at least one radical reactive with the isocyanato group.

20. A polyurethane which comprises the reaction product of (i) the in situ polymerizate of a mixture of styrene and ethylhexyl acrylate in a polypropyleneoxy glycol, and (ii) an organic polyisocyanate.

21. A polyurethane which comprises the reaction product of (i) the in situ polymerizate of acrylic acid in a polypropylenoxy glycol, and (ii) an organic polyisocyanate.

22. A polyurethane which comprises the reaction product of (i) the in situ polymerizate of a mixture of styrene and acrylic acid in a polypropyleneoxy glycol, and (ii) an organic polyisocyanate.

*23. A method for preparing cellular polyurethanes comprising reacting*

*(A) a liquid, stable reactive polymer-polyol mixture having a viscosity of less than about 40,000 cps. at 10% polymer concentration and having a combining weight in a range yielding elastic-to-rigid polyurethane products, the essential components of said reactive mixture consisting of*

*(1) a substantial but minor amount of film-forming polymer having a molecular weight of at least 5,000 and having a plurality of radicals containing active hydrogen atoms which are reactive with the — N=C=O radicals of an organic polyisocyanate, and*

*(2) a major amount of a solvent medium for said polymer consisting essentially of at least one normally liquid polyol essentially free from ethylenic unsaturation and having a molecular weight of at least about 500, said polymer (1) being the polymerizate obtained by polymerizing, to a molecular weight of at least 5,000 and to a solids concentration of about 10% to about 50% by weight, an ethylenically unsaturated monomer in such polyol, with*

*(B) an organic polyisocyanate to form such polyurethane, the ratio of the —N=C=O equivalents of (B) to the equivalents of reactive radicals of (A) being in the range of about 1–5 to 1, wherein mixture (A) and polyisocyanate (B) are reacted while in intimate admixture with a blowing agent to provide simultaneously reaction of said mixture (A) and polyisocyanate (B) and formation of cells in the polyurethane reaction product.*

*24. A polyurethane comprising the reaction product of claim 23.*

*25. A method for preparing polyurethanes comprising reacting*

*(A) a liquid, stable reactive polymer-polyol mixture having a viscosity of less than about 40,000 cps. at 10% polymer concentration and having a combining weight in a range yielding elastic-to-rigid polyurethane products, the essential components of said reactive mixture consisting of*

*(1) a substantial but minor amount of film-forming polymer having a molecular weight of at least 5,000 and having a plurality of radicals containing active hydrogen atoms which are reactive with the —N=C=O radicals of an organic polyisocyanate, said film-forming polymer is a polymer of an ethylenically unsaturated monomer containing an organic, nitrogen-containing radical in which all of the nitrogen bonds are satisfied by bonds with at least one member selected from the group consisting of carbon and hydrogen, and*

*(2) a major amount of a solvent medium for said polymer consisting essentially of at least one normally liquid polyol essentially free from ethylenic unsaturation and having a molecular weight of at least about 500, said polymer (1) being the polymerizate obtained by polymerizing, to a molecular weight of at least 5,000 and to a solids concentration of about 10% to about 50% by weight, an ethylenically unsaturated monomer in such polyol, with*

*(B) an organic polyisocyanate to form such polyurethane, the ratio of the —N=C=O equivalents of (B) to the equivalents of reactive radicals of (A) being in the range of about 1–5 to 1.*

*26. A method in accordance with claim 25 in which said organic nitrogen-containing radical is an amino radical.*

*27. A polyurethane comprising the reaction product of claim 25.*

*28. A method in accordance with claim 25 for the production of a cellular polyurethane in which mixture (A) and polyisocyanate (B) are reacted while in intimate admixture with a blowing agent to provide simultaneously reaction of said mixture (A) and polyisocyanate (B) and formation of cells in the polyurethane reaction product.*

*29. A method in accordance with claim 28 in which the polymer concentration in reactive polymer-polyol mixture (A) is at least 10% by weight of said mixture.*

*30. A polyurethane comprising the reaction product of claim 28.*

*31. A method in accordance with claim 1 in which the polymer concentration in reactive polymer-polyol mixture (A) is about 20% to 50% by weight of said mixture.*

*32. A method in accordance with claim 1 in which the polyol is a polyoxypropylene polyol.*

*33. A method in accordance with claim 1 in which the polyol is a polyoxypropylene glycol.*

*34. A method in accordance with claim 1 in which the polyol is a polyoxypropylene triol.*

*35. A method in accordance with claim 1 in which the polymer has a molecular weight of 10,000 or greater.*

*36. A method in accordance with claim 1 in which the polymer in the reactive polymer-polyol mixture (A) is dispersed in the polyol of said mixture to form a stable dispersion.*

*37. A method in accordance with claim 1 in which the polymerization of the ethylenically unsaturated monomer in the polyol is carried out in the presence of azobisbutyronitrile as a catalyst.*

*38. A method for preparing cellular, elastic polyurethanes having improved load-bearing properties comprising reacting*

*(A) a liquid, stable reactive polymer-polyol mixture convertible to an elastic polyurethane product having a viscosity of less than about 40,000 cps. at 10% polymer concentration and having a combining weight in a range yielding elastic polyurethane products, the essential components of said reactive mixture consisting of*

*(1) a substantial but minor amount of film-forming polymer having a molecular weight of at least 10,000 and having a plurality of radicals containing active hydrogen atoms which are reactive with the —N=C=O radicals of an organic polyisocyanate, and*

*(2) a major amount of a solvent medium for said polymer consisting essentially of at least one normally liquid polyoxypropylene polyol essentially free from ethylenic unsaturation and having a molecular weight of at least about 1000, said polymer (1) being the polymerizate obtained by polymerizing, to a molecular weight of at least 10,000 and to a solids concentration of about 10% to about 50% by weight, an ethylenically polyol (2) to form a dispersion with*

*(B) an organic polyisocyanate to form such polyurethane, the ratio of the —N=C=O equivalents of (B) to the equivalents of reactive radicals of (A) being in the range of about 1–5 to 1, wherein mixture (A) and polyisocyanate (B) are reacted while in intimate admixture with a blowing agent to provide simultaneously reaction of said mixture (A) and polyisocyanate (B) and formation of cells in the polyurethane reaction product.*

*39. A method as claimed in claim 38 in which the polymerization of the ethylenically unsaturated monomer in the polyol is carried out in the presence of azobisisobutyronitrile as a catalyst.*

*40. A method as claimed in claim 29 in which the polymer concentration in the polymer-polyol mixture (A) is about 20% to 50% by weight of said mixture.*

*41. A method in accordance with claim 38 wherein said film former is made from an ethylenically unsaturated monomer containing an organic, nitrogen-containing radical in which all of the nitrogen bonds are satisfied by bonds with at least one member selected from the group consisting of carbon and hydrogen.*

*42. A method in accordance with claim 1 in which the polyol in the reactive polymer-polyol mixture (A) has a molecular weight of at least about 2,000.*

* * * * *

UNITED STATES PATENT OFFICE
CERTIFICATE OF CORRECTION

Patent No. Re. 29,118 :ed January 18, 1977

Inventor(s) Paul Stamberger

It is certified that error appears in the above-identified patent and that said Letters Patent are hereby corrected as shown below:

On the title page "Appl. No: 443,774" should read -- Appl. No.: 443,744 --

Col. 28, line 4 should read -- an ethylenically unsaturated monomer in such polyol, said polymer (1) being dispersed in said polyol --

Col. 28, line 18, "claim 29" should read -- claim 39 --

Signed and Sealed this

*nineteenth* Day of *July 1977*

[SEAL]

*Attest:*

RUTH C. MASON
*Attesting Officer*

C. MARSHALL DANN
*Commissioner of Patents and Trademarks*